United States Patent [19]
Harris

[11] 3,906,377
[45] Sept. 16, 1975

[54] PULSE CENTROID DETECTOR

[75] Inventor: Robert W. Harris, Alexandria, Va.

[73] Assignee: The United States of America as represented by the Secretary of the Navy, Washington, D.C.

[22] Filed: July 23, 1974

[21] Appl. No.: 491,020

[52] U.S. Cl. ............... 328/108; 307/229; 307/231; 307/232; 307/235 R; 328/107; 328/127; 235/183

[51] Int. Cl.² ...................... H03K 5/20; G06G 7/18

[58] Field of Search ........ 307/229, 232, 235 R, 234; 328/108–112, 115–117, 127; 235/183

[56] References Cited
UNITED STATES PATENTS

| | | | |
|---|---|---|---|
| 2,994,822 | 8/1961 | Isley, Jr. | 235/183 |
| 3,004,707 | 10/1961 | Wilson | 235/183 |
| 3,095,541 | 6/1963 | Ashcraft | 307/234 |
| 3,363,187 | 1/1968 | Hickin | 328/108 |
| 3,461,389 | 8/1969 | Whalen | 328/109 |
| 3,723,713 | 3/1973 | Banner et al. | 307/234 |
| 3,803,394 | 4/1974 | Fraser | 235/183 |
| 3,852,673 | 12/1974 | Guyot et al. | 328/127 |

*Primary Examiner*—Stanley D. Miller, Jr.
*Attorney, Agent, or Firm*—R. S. Sciascia; Arthur L. Branning; George A. Montayne

[57] ABSTRACT

An improved device for measuring the time of occurrence of a pulse centroid, particularly for irregularly shaped electrical pulses. An electrical pulse is fed to a first integrator whose output is fed to a summing network and a second inverting integrator. The output from the second integrator is also fed to the summing network. The output of the summing network is then fed to a zero crossing detector which provides an output related in time to the time of occurrence of the pulse centroid.

3 Claims, 2 Drawing Figures

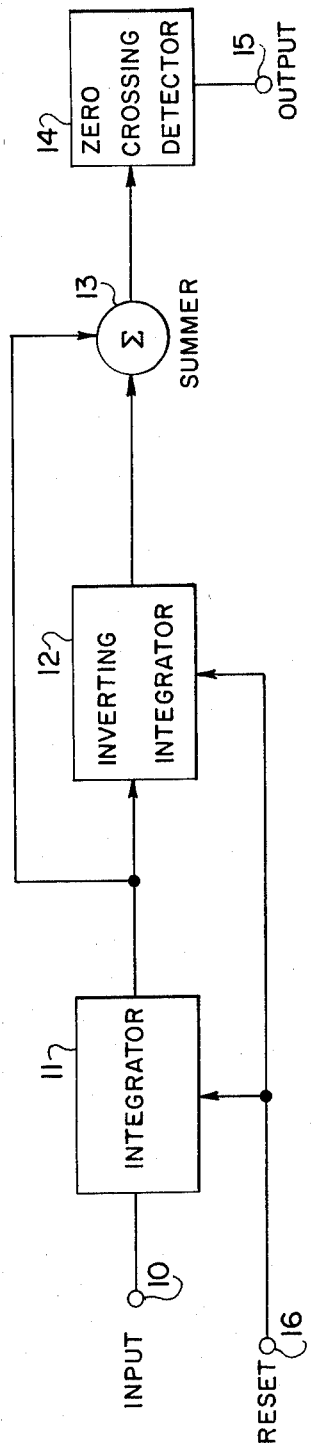
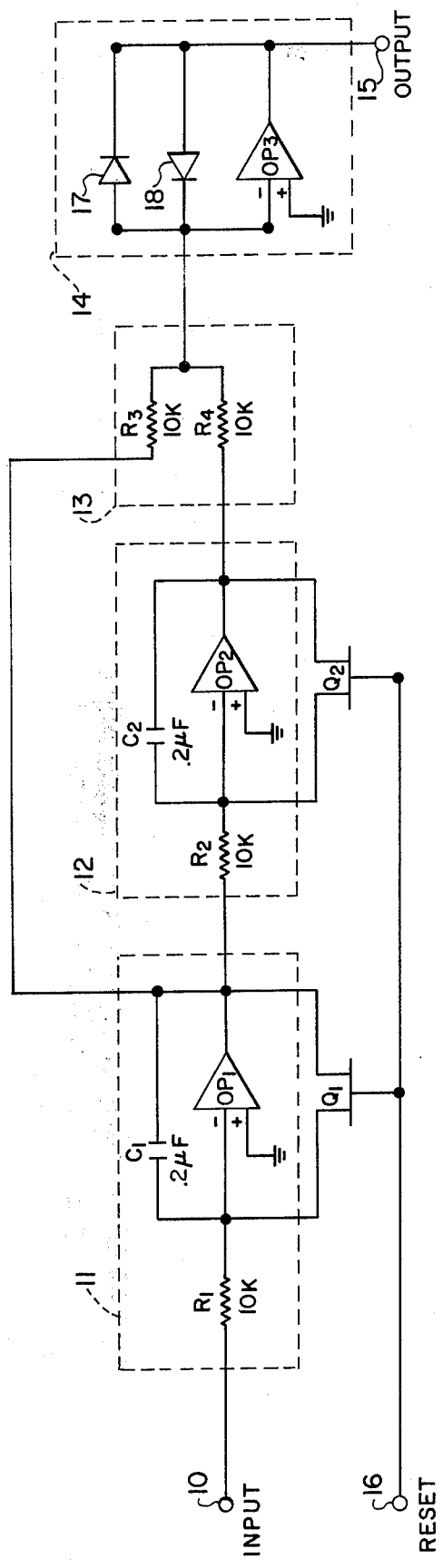
FIG. 1
FIG. 2

PULSE CENTROID DETECTOR

BACKGROUND OF THE INVENTION

The present invention relates to improvements in pulse detection circuits and more particularly to improved techniques for determining time occurrence of the centroid of irregularly shaped electrical pulses.

Of particular interest in certain environments is the time occurrence of an electrical pulse. While pulses can generally represent time events, the irregularity of pulse size and shape whether intentional or not, generally distorts an accurate measurement of a time event and therefore prevents efficient and reliable usage of the pulse contained information. Prior techniques designed to determine pulse position have in some instances measured the pulse peak position or the point of crossing of a predetermined threshold voltage in order to fix time occurrence. Both of these techniques, however, are very limited in accuracy by the uniformity and predictability of the measured pulse, and neither of the techniques is reliable when dealing with highly irregularly shaped pulses.

In still other techniques, the time occurrence of the pulse centroid has been used as one measure of pulse position. While the pulse centroid is generally an accurate measurement of pulse position, the prior known devices have suffered severe limitations due to the specific structures involved. In one particular example, as shown by U.S. Pat. No. 3,363,187, complex circuitry and threshold detection limit the usefulness of the centroid detector in many situations. In U.S. Pat. No. 3,461,389, special clipping circuits and delay line matching of integrated outputs add cost and complexity to centroid detection. In still another example in U.S. Pat. No. 3,004,707, special multiplier and divider circuits are required in a system designed particularly for use in radar applications.

Each of the above techniques and enabling structure utilize complex circuitry that adds cost and critical component structure to the performance of centroid detection. In addition, each of the circuits is designed to overcome specific problems encountered in the prior art and require many modifications and adjustments for use in a particular environment.

Accordingly, the present invention has been developed to overcome the specific shortcomings of the above known and similar techniques and to provide a more precise and reliable circuit for determining the time occurrence of a pulse centroid.

SUMMARY OF THE INVENTION

It is an object of this invention, therefore, to provide a pulse centroid detector that has all the advantages of similarly employed techniques and none of the disadvantages.

Another object of this invention is to provide a device for indicating the time occurrence of a pulse centroid that is highly accurate and relatively insensitive to pulse size and shape, particularly irregularly shaped electrical pulses.

A further object of the invention is to provide a detector that is simple in implementation, uses fewer elements and yet is highly reliable and versatile in operation.

A still further object of the invention is to provide a centroid detector which can be used to detect the centroid of each of a recurring series of electrical pulses by providing an indicating signal a predetermined time after each pulse centroid.

In order to accomplish the above and other objects, the present invention utilizes two common electrical integrating elements to sense the incoming pulse and provide a first and second integral of the pulse. The second integral of the pulse is inverted relative to the first integral and compared to the first integral in a summing network. The output of the summing network is then sensed by a zero crossing detector which indicates when the sum of the integrals goes to zero. According to the relationship between the first and second integrals of the input pulse an output signal will be provided a fixed time after the occurrence of the centroid of the input pulse regardless of the irregular nature of the input pulse.

Other objects, advantages, and novel features of the invention will become apparent from the following detailed description when considered with the accompanying drawings wherein:

BRIEF DESCRIPTION OF THE DRAWINGS

FIG. 1 is a block diagram of the pulse centroid detector according to the present invention.

FIG. 2 is a schematic diagram of a preferred embodiment of the circuit of FIG. 1.

DETAILED DESCRIPTION OF PREFERRED EMBODIMENT

Referring to FIG. 1, the illustration shown is a functional diagram that represents the cooperation and arrangements of the circuits forming the centroid detector according to the present invention. Generally speaking, pulses are sensed at input 10 and fed to a first integrating circuit 11 which provides an output representing the first integral of the pulse input 10. The output from integrator 11 is applied to a second inverting integrator 12 which provides an output representing a second integral of the pulse input 10 and of opposite polarity from the output of 11. The outputs from integrators 11 and 12 are fed to a summing network 13 where the two integrated outputs are added. Subsequently, the output from the summing network is fed to a zero crossing detector 14 which senses the point in time when the summed outputs from 11 and 12 go through zero, and provides an indication of the zero crossing at output 15 at that time. Reset 16, also shown in FIG. 1, provides an input signal to integrators 11 and 12 to set the circuits for initial operation prior to pulse reception.

Turning now to FIG. 2, the particular circuit elements which form one embodiment of the circuit of FIG. 1, are shown in schematic form. In this embodiment like numerals are used to represent like elements referred to in FIG. 1. Pulses received at input 10 are fed to resistor $R_1$ capacitor $C_1$, and operational amplifier $OP_1$ which are generally connected to form the first integrator 11, in this case an inverting integrator. The output from integrator 11 is fed to resistor $R_2$, capacitor $C_2$, and operational amplifier $OP_2$ connected to form integrator 12 also an inverting integrator. The outputs from integrators 11 and 12 are fed to resistors $R_3$ and $R_4$ which generally comprise the summing network 13 and which are in turn connected to a common point as input to the zero crossing detector 14. The detector in this case is formed from two diodes 17 and 18 oppositely connected in parallel with the negative input and the output of operational amplifier $OP_3$ having an output at 15 which provides the indication of centroid detection as will be later explained.

Also shown in FIG. 2 is the reset circuit composed of input line 16 feeding transistors $Q_1$ and $Q_2$ generally shown as field effect transistors (FET). The transistors are connected in parallel with the capacitors $C_1$ and $C_2$ across the negative input and the output of operational amplifiers $OP_1$ and $OP_2$ respectively.

The values for the resistor and capacitor elements may be $10K\Omega$ and $0.2\mu F$ respectively, as shown in the drawing, or any other values consistent with circuit operation according to the present teachings.

The operation of the detector in determining the time occurrence of a pulse centroid can now be explained with reference to FIGS. 1 and 2. Input 10 is connected to receive a pulse for which the centroid is to be detected. Generally, the pulse will have a zero baseline and positive or negative amplitude constituting the pulse over the period of its duration. As in all electrical circuits, in order to provide proper element values for operation, certain characteristics of the applied signals are known or estimated, in this case the pulse duration and arrival time. Prior to the expected arrival of the pulse, a voltage is applied to reset 16 which gates transistors $Q_1$ and $Q_2$ in such manner as to discharge capacitors $C_1$ and $C_2$ and initially set the output of integrators 11 and 12 to zero. The reset is then disabled and the circuit ready fro reception of the pulse at input 10. Assuming that the input pulse is positive, integrator 11, formed as an inverting integrator, will form a negative of the time integral of the input pulse. If we represent the input voltage of the pulse as I(t) then the output voltage Ve of the first integrator as a function of time t can be expressed as $$Ve(t) = -\frac{1}{\tau_1} \int_0^t I(t') dt' \quad (1)$$

where $\tau_1$ is the time constant $R_1C_1$ of the first integrator 11.

The output from integrator 11 is then fed to the second inverting integrator 12 which forms a positive second integral of the input pulse at 10, and can be expressed in terms of the output voltage Vf as a function of time t as $$Vf(t) = -\frac{1}{\tau_2} \int_0^t Ve(t'') dt'' \quad (2)$$

where $\tau_2$ is the time constant $R_2C_2$ of the second integrator 12. Substituting for Ve(t), equation 2 can be rewritten as the double integral:

$$Vf(t) = +\frac{1}{\tau_1\tau_2} \int_0^t \int_0^{t''} I(t') dt' dt'' \quad (3)$$

The order of integration can then be reversed to give the expression:

$$Vf(t) \frac{1}{\tau_1\tau_2} \int_0^t \int_{t'}^t I(t') dt'' dt' \quad (4)$$

and the integral performed to give $$Vf(t) = \frac{1}{\tau_1\tau_2} \int_0^t (t-t') I(t') dt' \quad (5)$$

The outputs from integrators 11 and 12 are then defined by equations (1) and (5) and when combined at the summing network 13, at first produce an output voltage which goes negative during the pulse and later crosses zero and goes positive. The sum of the two inputs from 13 can be represented by combining equations (1) and (5) to give the expression for the sum voltage Vg as a function of time t as $$Vg(t) = \frac{1}{\tau_1\tau_2} \int_0^t (t-t'-\tau_2) I(t') dt' \quad (6)$$

If we assume that the zero crossing is represented by the voltage $Vg(t_z) = 0$, then $t_z$ is the time of zero crossing of the summed output Vg of integrators 11 and 12 and $$Vg(t_z) = 0 = \frac{1}{\tau_1\tau_2} \int_0^{t_z} (t_z-t'-\tau_2) I(t') dt' \quad (7)$$

But this equation is the defining equation for a centroid where $(t_z - \tau_2)$ is the centroid of the input pulse I(t). The zero crossing of Vg therefore occurs at a time $t_z$ which occurs after the centroid of I(t) by a time delay $\tau_2$. Since the time delay $\tau_2$ is the time constant of the second integrator, the centroid of any input pulse can be accurately located offset by a constant $\tau_2$. The only requirement of the circuit is to insure that the input pulse has finished prior to the zero crossing which in practice can be assured by making $\tau_2$ larger than the expected half-width of the input pulse since the zero crossing occurs at a time beyond the pulse centroid which is equal to the time constant $\tau_2$ of the second inverting integrator.

In operation, the time at which the zero crossing occurs as indicated by the detector 14, is exhibited by a change in output voltage of the output 15 from a constant positive voltage to a constant negative voltage, in the present example from +0.6 volts to −0.6 volts as governed by the diodes 17 and 18. This change in voltage indicates that the centroid was located at a time $\tau_2$ earlier, and accurately fixes the time of occurrence of such centroid.

Following the completion of the pulse I(t) which is indicated by the zero crossing at the output of detector 14, a reset pulse can be applied to input 16 to gate transistors $Q_1$ and $Q_2$ in such manner as to discharge the capacitors $C_1$ and $C_2$ and ready the circuit for detection of the time occurrence of the centroid of a subsequent pulse.

In the present example the pulse centroid detector was tested using pulses having an amplitude up to 5 volts, a pulse duration up to 2.0 m sec, a frequency of approximately 150 Hz, and $\tau_1$ and $\tau_2$ set at 2.0 m sec. The detector was used to indicate the wander of a spot image of a light source where the image was represented by a series of video pulses of irregular shape generally having the above characteristics. Each video pulse represented the cross section of intensity of the spot image for one scan of the spot image. Since the position of the spot image in space can be related to the position of the pulse centroid in time, the wander of the spot from a given position was indicated by noting any change in the time of occurrence of the pulse centroid from one scan to the next. Using the present invention it was found that the wander could be detected in a highly reliable and accurate manner over many repetitions of the input pulse regardless of the size and shape of the pulses.

From the above description it can be seen that the present invention provides a very simple and reliable device for detecting the time occurrence of a pulse centroid for irregularly shaped pulses. Contrary to prior known techniques and devices, the present invention utilizes only four basic components formed from inexpensive resistors, capacitors, diodes, transistors and operational amplifiers, which are highly accurate and reliable in operation and do not require critical adjustments for any particular application. The device is relatively insensitive to pulse shape and is therefore capable of versatile operation in many environments to effectively designate the time occurrence of the pulse centroid a predetermined time after the occurrence of such centroid. Using fewer elements than prior known devices, the invention is capable of sensing the centroid of a plurality of recurring pulses enabling the time position of such pulses to be accurately recorded.

While the invention has been described with reference to particular, elements and values, it is obvious that many other equivalent elements and values could be substituted to provide similar functions in the detector of FIG. 1. It is also noted that while integrator 11 was shown as an inverting intergrator, the same could just as well be a straight integrator provided that it is recognized that the zero crossing will be detected by a change in voltage from negative to positive rather than vice versa. Likewise, while the operation was described with reference to positive pulses, the device is equally effective for negative pulse inputs.

Obviously many more modifications and variations of the present invention are possible in light of the above teachings. It is therefore to be understood that within the scope of the appended claims, the invention may be practiced otherwise than as specifically described.

What is claimed is:

1. An apparatus for providing an indication of the time occurrence of a pulse centroid comprising:
    first integrating means for receiving an electrical input pulse and providing an integrated first output of said pulse;
    inverting integrating means for receiving said first output and providing an inverted integrated second output;
    means for summing said first and second outputs; and
    mean for detecting the time occurrence of the zero crossing of said summed first and second outputs.

2. The apparatus of claim 1 further including means for setting the outputs of each integrating means to zero after the completion of each input pulse.

3. The apparatus of claim 1 wherein said first integrating means comprises an inverting integrator.

* * * * *